US008983744B2

(12) United States Patent
Komura et al.

(10) Patent No.: US 8,983,744 B2
(45) Date of Patent: Mar. 17, 2015

(54) AUTOMATIC SHIFT APPARATUS

(71) Applicant: Aisin Seiki Kabushiki Kaisha, Kariya-shi (JP)

(72) Inventors: Masahiko Komura, Kariya (JP); Yuuki Ohta, Kariya (JP); Kyosuke Mori, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/151,055

(22) Filed: Jan. 9, 2014

(65) Prior Publication Data
US 2014/0214291 A1 Jul. 31, 2014

(30) Foreign Application Priority Data

Jan. 31, 2013 (JP) ................................. 2013-017261

(51) Int. Cl.
*G06F 7/00* (2006.01)
*F16H 61/68* (2006.01)
*F16H 61/04* (2006.01)

(52) U.S. Cl.
CPC ............ *F16H 61/68* (2013.01); *F16H 61/0437* (2013.01); *F16H 2061/0474* (2013.01); *F16D 2500/50615* (2013.01)
USPC ................................. 701/67; 74/339; 192/101

(58) Field of Classification Search
CPC ..................... B60W 10/02; B60W 2510/0208; B60W 2710/02
See application file for complete search history.

(56) References Cited

U.S. PATENT DOCUMENTS

| | | | | |
|---|---|---|---|---|
| 4,449,416 A | * | 5/1984 | Huitema | ...................... 74/336 R |
| 7,662,063 B2 | * | 2/2010 | Schnitzer | ........................ 477/70 |
| 2007/0227283 A1 | * | 10/2007 | Fujimoto et al. | ............. 74/337.5 |
| 2010/0082210 A1 | * | 4/2010 | Kobayashi et al. | ............. 701/66 |
| 2010/0257969 A1 | * | 10/2010 | Martin et al. | .................... 74/374 |
| 2013/0240317 A1 | * | 9/2013 | Mori et al. | .................... 192/69.8 |
| 2013/0240318 A1 | * | 9/2013 | Mori et al. | .................... 192/69.9 |
| 2014/0214293 A1 | * | 7/2014 | Mori et al. | ...................... 701/60 |
| 2014/0214294 A1 | * | 7/2014 | Mori et al. | ...................... 701/60 |

FOREIGN PATENT DOCUMENTS

| EP | 2 515 009 A2 | 10/2012 |
|---|---|---|
| JP | 2012-225436 | 11/2012 |

* cited by examiner

*Primary Examiner* — David D Le
(74) *Attorney, Agent, or Firm* — Oblon, McClelland, Maier & Neustadt, L.L.P.

(57) ABSTRACT

An automatic shift apparatus includes a rotation shaft, a dog clutch gear shift mechanism, and a control unit. The control unit controls first moving speed to be faster than second moving speed on moving a sleeve in an engaged state engaged with one of a first clutch ring and a second clutch ring to a neutral position defined at a position between the first clutch ring and the second clutch ring where the first moving speed is a speed of moving the sleeve in the engaged state to a target position defined between the neutral position and the mentioned one of the first clutch ring and the second clutch ring the sleeve is engaged with and where the second moving speed is a speed of moving the sleeve from the target position to the neutral position.

4 Claims, 15 Drawing Sheets

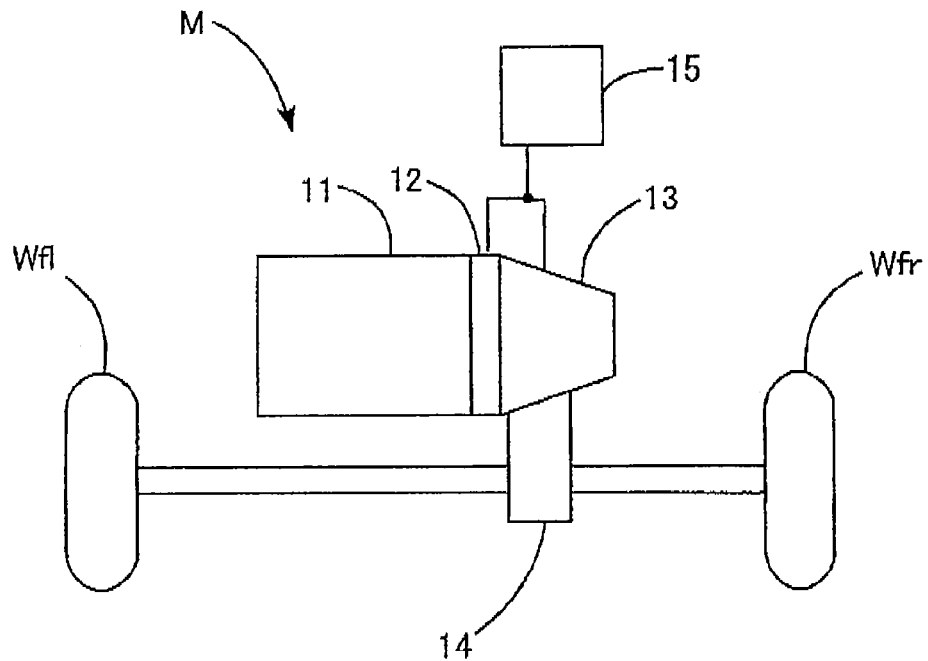
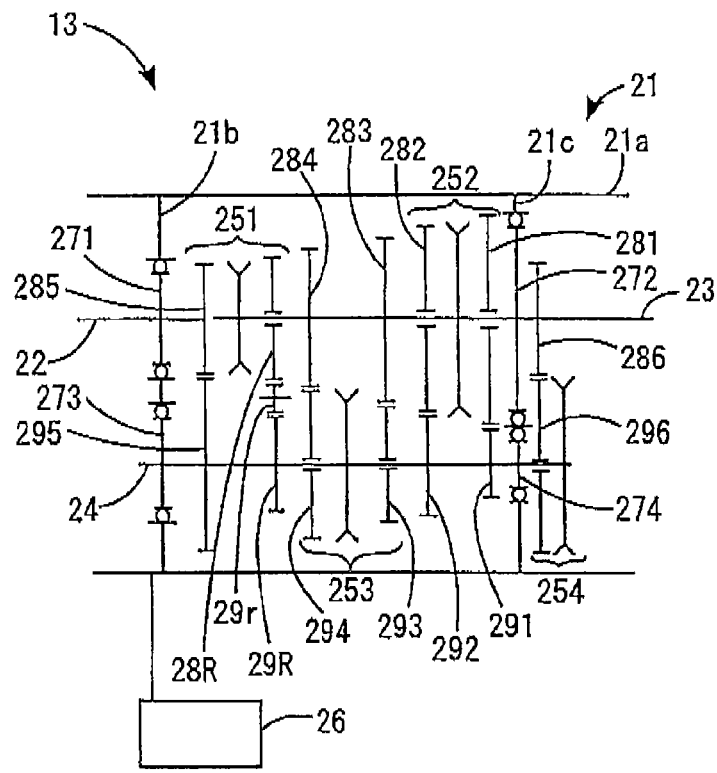

AUTOMATIC SHIFT APPARATUS

CROSS REFERENCE TO RELATED APPLICATIONS

This application is based on and claims priority under 35 U.S.C. §119 to Japanese Patent Application 2013-017261, filed on Jan. 31, 2013, the entire content of which is incorporated herein by reference.

TECHNICAL FIELD

This disclosure generally relates to an automatic shift apparatus.

BACKGROUND DISCUSSION

An automatic shift apparatus disclosed in JP2012-225436A, hereinafter referred to as Reference 1, for example, includes a first clutch ring, a second clutch ring, a sleeve arranged between the first clutch ring and the second clutch ring to be movable in an axial direction, a shaft moving apparatus for moving the sleeve in the axial direction, and a control unit driving the shaft moving apparatus. The first clutch ring and the second clutch ring are fixed gears. The sleeve is a movable gear. The control unit controls the sleeve, which is in an engaged state with the first clutch ring by a dog clutch portion of the sleeve and a dog clutch portion of the first clutch ring being engaged, to move toward a neutral position defined at a position between the first clutch ring and the second clutch ring. More specifically, the sleeve is made to stop at the neutral position by exerting a force in the opposite direction relative to a direction of movement of the sleeve after the dog clutch portions of the sleeve and the first clutch ring are disengaged.

In recent years, automatic shift apparatuses with a separation distance reduced between the first clutch ring and the second clutch ring are developed. In the automatic shift apparatus disclosed in Reference 1, in a state where a mechanism includes looseness, the sleeve may contact the second clutch ring by swinging movement in the axial direction at a time at which movement of the sleeve is made to stop at the neutral position. In a state where rotational speed of the second clutch ring is high, a shift shock and a contact noise are generated as a result of the sleeve making contact with the second clutch ring, which are considered as disadvantages. The sleeve making contact with the second clutch ring may be avoided by moving the sleeve in a low speed, however, a shift time becomes longer, which is considered as a disadvantage.

A need thus exists for an automatic shift apparatus, which is not susceptible to the drawbacks mentioned above.

SUMMARY

An automatic shift apparatus includes a rotation shaft axially supported to be rotatable about an axis of the rotation shaft, the rotation shaft configured to be in rotary engagement with one of an input shaft and an output shaft of the automatic shift apparatus, a dog clutch gear shift mechanism including a first clutch ring and a second clutch ring supported on the rotation shaft to be rotatable about the rotation shaft, the first clutch ring providing a first gear ratio, the first clutch ring configured to be in rotary engagement with the other one of the input shaft and the output shaft, the second clutch ring providing a second gear ratio, the second clutch ring configured to be in rotary engagement with the other one of the input shaft and the output shaft, a hub fixed on the rotation shaft at a position between the first clutch ring and the second clutch ring, the position adjacent to the first clutch ring and the second clutch ring, a sleeve fitted to the hub, the sleeve restrained from rotating relative to the hub, the sleeve allowed to move in a direction of the axis of the rotation shaft, a first dog clutch portion protrudingly arranged on a side of the first clutch ring in a direction of the sleeve and a second dog clutch portion protrudingly arranged on a side of the second clutch ring in a direction of the sleeve, the first dog clutch portion and the second dog clutch portion selectively meshing with a spline formed on the sleeve in response to axial movement of the sleeve, a shaft moving apparatus moving the sleeve in the direction of the axis of the rotation shaft, and a sensor detecting a position of the sleeve in accordance with movement of the sleeve in the direction of the axis of the rotation shaft, and a control unit controlling an operation of the shaft moving apparatus based on a detected position of the sleeve detected by the sensor. The control unit controls first moving speed to be faster than second moving speed on moving the sleeve in an engaged state engaged with one of the first clutch ring and the second clutch ring to a neutral position defined at a position between the first clutch ring and the second clutch ring where the first moving speed is a speed of moving the sleeve in the engaged state to a target position defined between the neutral position and the mentioned one of the first clutch ring and the second clutch ring the sleeve is engaged with and where the second moving speed is a speed of moving the sleeve from the target position to the neutral position.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a schematic drawing illustrating components of a vehicle including an automatic shift apparatus according to an embodiment;

FIG. 2 is a skeleton drawing illustrating components of the automatic shift apparatus illustrated in FIG. 1;

DETAILED DESCRIPTION

Figure 3:
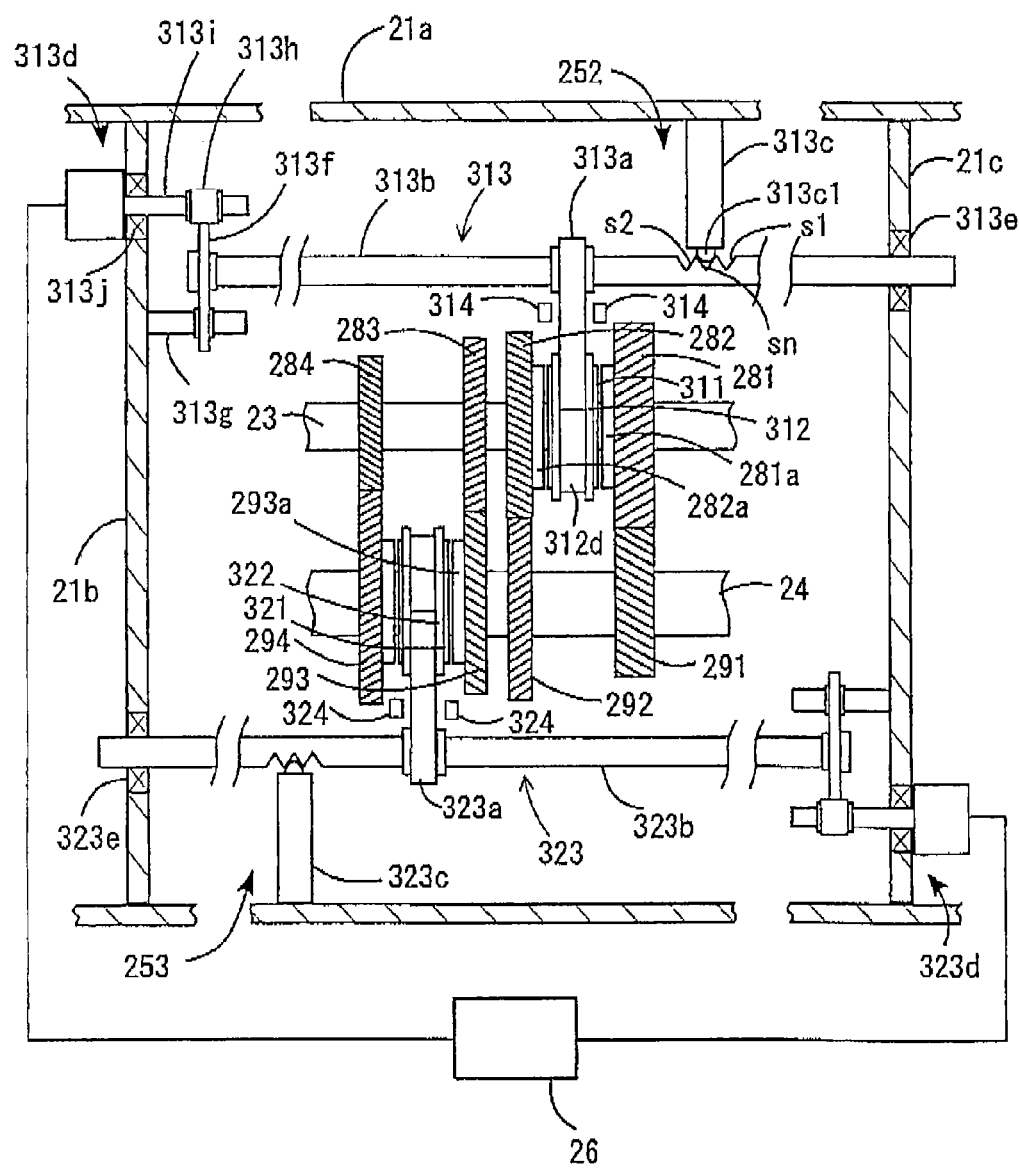
FIG. 3 is a drawing illustrating components of the automatic shift apparatus illustrated in FIG. 2 in part in detail.

An automatic shift apparatus 13 according to an embodiment will be described. First, components of a vehicle M including the automatic shift apparatus 13 according to the embodiment will be described referring to FIG. 1. The vehicle M includes components, for example, an engine 11, a clutch 12, the automatic shift apparatus 13, a differential apparatus 14, a control system 15, and driving wheels Wfl, Wfr, which are left and right front wheels.

The engine 11 is an apparatus generating a driving force by combustion of fuel. The driving force from the engine 11 is transmitted to the driving wheels Wfl, Wfr via the clutch 12, the automatic shift apparatus 13, and the differential apparatus 14. In other words, the vehicle M is a vehicle generally referred to as an FF vehicle. The clutch 12 is arranged to automatically connect and disconnect in response to commands from the control system 15. The automatic shift apparatus 13 automatically selects a gear position from, for example, six positions for forward movement and one position for rearward movement. The differential apparatus 14 includes each of a final gear and a differential gear as components. The differential apparatus 14 is integrally formed with the automatic shift apparatus 13.

Second, components of the automatic shift apparatus 13 will be described. As FIG. 2 illustrates, the automatic shift apparatus 13 includes, for example, a casing 21, a drive shaft 22, a main shaft 23, a counter shaft 24, dog clutch gear shift mechanisms 251, 252, 253, 254, and a shift control unit 26. The shift control unit 26 is included in the control system 15. The shift control unit 26 serves as the control unit. Exemplary components of the casing 21 are a main body 21a formed in substantially a hollow cylinder, a first wall 21b, and a second wall 21c. Each of the first wall 21b and the second wall 21c partitions a space inside the main body 21a into leftward-rightward spaces relative to the first wall 21b and the second wall 21c, where leftward and rightward refer to leftward and rightward in FIG. 2.

The drive shaft 22 and the main shaft 23 are coaxially arranged. The counter shaft 24 is arranged parallel to the drive shaft 22 and the main shaft 23. The drive shaft 22, the main shaft 23, and the counter shaft 24 are supported on the casing 21 to be rotatable. More specifically, one end of the drive shaft 22, which is leftward end in FIG. 2, is in rotary engagement with an output shaft of the engine 11 via the clutch 12. The other end of the drive shaft 22, which is rightward end in FIG. 2, is supported with a bearing 271 on the first wall 21b. As a result, an output from the engine 11 is inputted to the drive shaft 22 while the clutch 12 is connected.

One end of the main shaft 23, which is leftward end in FIG. 2, is axially supported on the mentioned other end of the drive shaft 22, which is rightward end in FIG. 2, to be rotatable via the dog clutch gear shift mechanism 251 in a state where the mentioned one end of the main shaft 23 may be in rotary engagement with the mentioned other end of the drive shaft 22. The dog clutch gear shift mechanism 251 will be described later. The other end of the main shaft 23, which is rightward end in FIG. 2, is supported with a bearing 272 on the second wall 21c. The main shaft 23 serves as the rotation shaft. The counter shaft 24 may serve as the rotation shaft. One end of the counter shaft 24, which is leftward end in FIG. 2, is supported with a bearing 273 on the first wall 21b. The other end of the counter shaft 24, which is rightward end in FIG. 2, is supported with a bearing 274 on the second wall 21c.

In order from a direction where the clutch 12 is positioned, the main shaft 23 is arranged with the dog clutch gear shift mechanism 251, which shifts gears into fifth speed or into reverse, and the dog clutch gear shift mechanism 252, which shifts gears into second speed or into first speed. In order from the direction where the clutch 12 is positioned, the counter shaft 24 is arranged with the dog clutch gear shift mechanism 253, which shifts gears into fourth speed or into third speed, and the dog clutch gear shift mechanism 254, which shifts gears into sixth speed. The dog clutch gear shift mechanisms 251, 252, 253, 254 are provided with gears 281, 282, 283, 284, 285, 286, 28R for shifting into different speeds, each of which will be described later.

Rotational center of a fifth gear 285 is fixed on the mentioned other end of the drive shaft 22, which is rightward end in FIG. 2, for example, by spline fitting. In order from the direction where the clutch 12 is positioned, the main shaft 23 is arranged with a reverse gear 28R, a fourth gear 284, a third gear 283, a second gear 282, a first gear 281, and a sixth gear 286. The reverse gear 28R is rotatably supported on the main shaft 23. The fourth gear 284 is fixed on the main shaft 23, for example, by spline fitting at rotational center of the fourth gear 284. The third gear 283 is fixed on the main shaft 23, for example, by spline fitting at rotational center of the third gear 283. The second gear 282 is rotatably supported on the main shaft 23. The first gear 281 is rotatably supported on the main shaft 23. The sixth gear 286 is fixed on the main shaft 23, for example, by spline fitting at rotational center of the sixth gear 286.

In order from the direction where the clutch 12 is positioned, the counter shaft 24 is arranged with a fifth counter gear 295, a reverse counter gear 29R, a fourth counter gear 294, a third counter gear 293, a second counter gear 292, a first counter gear 291, and a sixth counter gear 296. The fifth counter gear 295 is a gear that meshes with the fifth gear 285. The fifth counter gear 295 is fixed on the counter shaft 24, for example, by spline fitting at rotational center of the fifth counter gear 295. The reverse counter gear 29R is a gear that meshes with the reverse gear 28R via a gear 29r. The reverse counter gear 29R is fixed on the counter shaft 24, for example, by spline fitting at rotational center of the reverse counter gear 29R. The fourth counter gear 294 is a gear that meshes with the fourth gear 284. The fourth counter gear 294 is rotatably supported on the counter shaft 24. The third counter gear 293 is a gear that meshes with the third gear 283. The third counter gear 293 is rotatably supported on the counter shaft 24. The second counter gear 292 is a gear that meshes with the second gear 282. The second counter gear 292 is fixed on the counter shaft 24, for example, by spline fitting at rotational center of the second counter gear 292. The first counter gear 291 is a gear that meshes with the first gear 281. The first counter gear 291 is fixed on the counter shaft 24, for example, by spline fitting at rotational center of the first counter gear 291. The sixth counter gear 296 is a gear that meshes with the sixth gear 286. The sixth counter gear 296 is rotatably supported on the counter shaft 24. On an outer peripheral surface of the first gear 281 and on an outer peripheral surface of the first counter gear 291, gears, more specifically helical gears, meshing with each other are formed. Gears are similarly formed between other gears meshing with each other.

As FIG. 3 illustrates, the dog clutch gear shift mechanism 252 includes, as exemplary components, the first gear 281, which serves as a first clutch ring, the second gear 282, which serves as a second clutch ring, a clutch hub 311, which serves as a hub, a sleeve 312, a shaft moving apparatus 313, and a position detection sensor 314, which serves as a sensor. The dog clutch gear shift mechanism 253, which serves as a separate dog clutch gear shift mechanism, includes, as exemplary components, the third counter gear 293 and the fourth counter gear 294, each of which serves as a separate clutch ring, a clutch hub 321, which serves as a separate hub, a sleeve 322, which serves as a separate sleeve, a shaft moving apparatus 323, which serves as a separate shaft moving apparatus, and a position detection sensor 324, which serves as a separate sensor. The dog clutch gear shift mechanism 251, which serves as the separate dog clutch gear shift mechanism, is composed similarly to the dog clutch gear shift mechanism 253. Each of the reverse gear 28R and the fifth gear 285 in the dog clutch gear shift mechanism 251 serves as the separate clutch ring. The dog clutch gear shift mechanism 254, which serves as the separate dog clutch gear shift mechanism, includes the sixth counter gear 296 alone, the sixth counter gear 296 that serves as the separate clutch ring that serves similarly to the first clutch ring in the dog clutch gear shift mechanism 252. The dog clutch gear shift mechanism 254 does not include a component that serves similarly to the second clutch ring in the dog clutch gear shift mechanism 252. An arrangement of the dog clutch gear shift mechanism 252 will be described in detail next.

Figure 4:
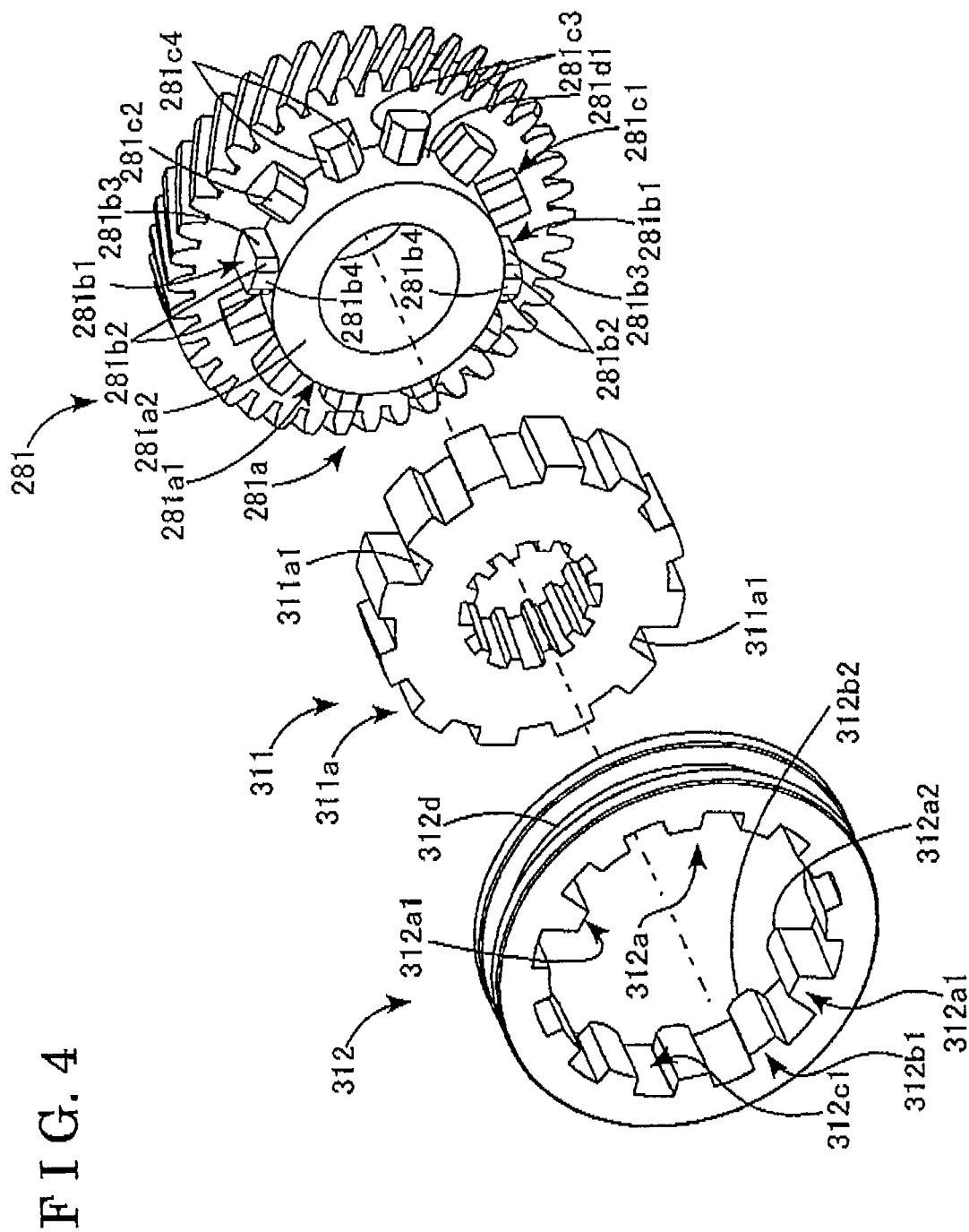
FIG. 4 is a perspective view drawing illustrating a first gear, a clutch hub, and a sleeve forming a dog clutch gear shift mechanism illustrated in FIG. 2.

The clutch hub 311 is fixed on the main shaft 23, for example, by spline fitting at a position between the first gear 281 and the second gear 282, the position adjacent to the first gear 281 and the second gear 282. On a side surface of the first gear 281, the surface in a direction of the clutch hub 311, a first dog clutch portion 281a is formed. The first dog clutch portion 281a engages with a spline 312a formed on the sleeve 312, which is illustrated in FIG. 4. Similarly, on a side surface of the second gear 282, the surface in a direction of the clutch hub 311, a second dog clutch portion 282a is formed. The second dog clutch portion 282a engages with the spline 312a formed on the sleeve 312. The first dog clutch portion 281a of the first gear 281 and the second dog clutch portion 282a of the second gear 282 are identically formed. Accordingly, the first gear 281, the clutch hub 311, and the sleeve 312 are selected for description in detail referring to FIGS. 4 to 7.

Figure 5A:
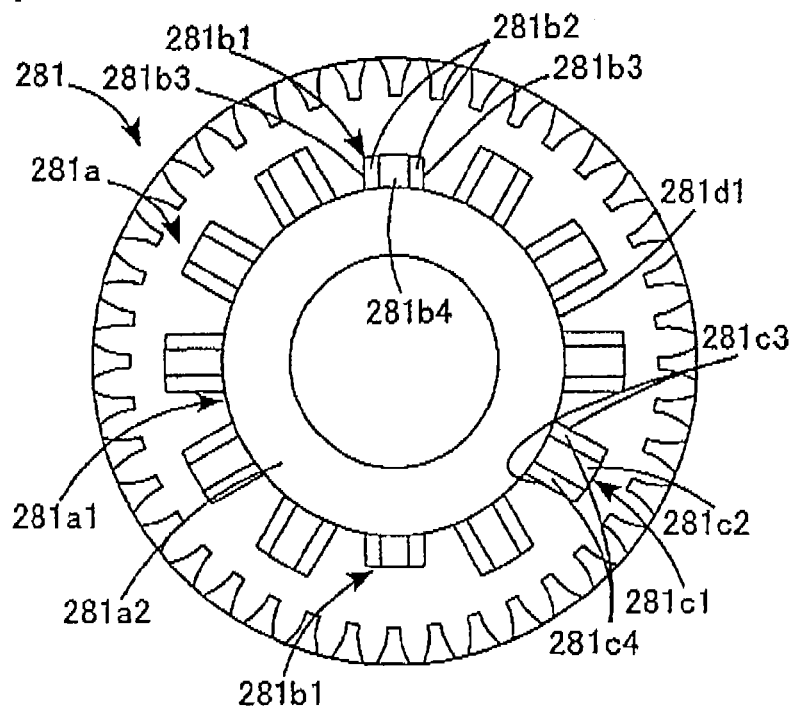
FIG. 5A is a plan view drawing illustrating the first gear illustrated in FIG. 4.
Figure 5B:
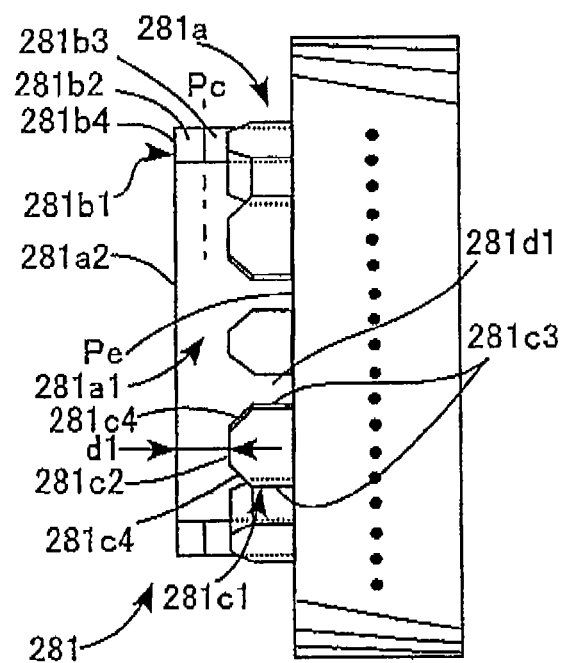
FIG. 5B is a side view drawing illustrating the first gear illustrated in FIG. 4.

As FIG. 4, FIG. 5A, and FIG. 5B illustrate, the first dog clutch portion 281a includes a protruding portion 281a1, two clutch front teeth 281b1, and clutch rear teeth 281c1. The protruding portion 281a1 is formed in a ring form. The clutch front teeth 281b1 are arranged on an outer peripheral portion of the protruding portion 281a1 at 180 degrees interval. The clutch rear teeth 281c1 are arranged on the outer peripheral portion of the protruding portion 281a1 between the two clutch front teeth 281b1. More specifically, five clutch rear teeth 281c1 are arranged at equally distanced intervals between the two clutch front teeth 281b1 in each circumferential direction. The clutch front teeth 281b1 and the clutch rear teeth 281c1 are formed on the outer peripheral portion of the protruding portion 281a1 separated by a clutch tooth recess 281d1 between each of the clutch front teeth 281b1 and the clutch rear teeth 281c1. Each of the clutch teeth recesses 281d1 is provided with a unique width in the circumferential direction.

The protruding portion 281a1 is formed such that the outer diameter of the protruding portion 281a1 is smaller than the inner diameter of high teeth 312a1 of the spline 312a. The clutch front teeth 281b1 are formed such that the outer diameter of the clutch front teeth 281b1 is larger than the inner diameter of the high teeth 312a1 of the spline 312a and is smaller than the inner diameter of low teeth 312b1 of the spline 312a. The clutch rear teeth 281c1 are formed to be engageable with spline tooth recesses 312c1 of the spline 312a. In other words, the clutch front teeth 281b1 are formed not to mesh with the low teeth 312b1 and formed to be able to mesh with the high teeth 312a1. The clutch rear teeth 281c1 are formed to be able to mesh with the high teeth 312a1 and the low teeth 312b1.

Number of the clutch front teeth 281b1 formed equals the number of the high teeth 312a1 formed. In the automatic shift apparatus 13 according to the embodiment, two clutch front teeth 281b1 are formed and equally two high teeth 312a1 are formed. The clutch front teeth 281b1 are formed short so that two high teeth 312a1 may easily make entry into a space between two clutch front teeth 281b1 even in a state where rotational speed difference between the sleeve 312 and the first gear 281 is large. Each of the clutch front teeth 281b1 is formed to extend from a front end surface 281a2 of the protruding portion 281a1 to a rear end position Pe of the first dog clutch portion 281a. Each of the clutch front teeth 281b1 extends at a position corresponding to the high tooth 312a1. Each of the clutch rear teeth 281c1 is formed to extend from a position recessed from the front end surface 281a2 of the protruding portion 281a1 by a first predetermined amount d1 to the rear end position Pe of the first dog clutch portion 281a.

A contact surface 281b4 that may make contact with the high teeth 312a1 is formed at a front end portion of each of the clutch front teeth 281b1, the front end portion facing the high tooth 312a1. Furthermore, from each side in the circumferential direction of the contact surface 281b4, a slanted surface 281b2 slanting toward the rear end position Pe of the first dog clutch portion 281a is formed. The contact surface 281b4 of the clutch front tooth 281b1 is formed on a same plane as the front end surface 281a2 of the protruding portion 281a1 or, alternatively, on a plane parallel to the front end surface 281a2 of the protruding portion 281a1.

A contact surface 281c2 that may make contact with the high teeth 312a1 and the low teeth 312b1 is formed on each of the clutch rear teeth 281c1. Furthermore, a side slanted surface 281c4 is formed to extend from each side in the circumferential direction of the contact surface 281c2 to each of side surfaces 281c3 of the clutch rear tooth 281c1. The slanted surface 281b2 of the clutch front tooth 281b1 and a side surface 281b3 of the clutch front tooth 281b1 intersect at a position Pc. The slanted surface 281b2 of the clutch front tooth 281b1 is formed so that the position Pc is defined at a position in a direction of the front end surface 281a2 of the protruding portion 281a1 relative to the contact surface 281c2 of the clutch rear tooth 281c1. Portions where the contact surface 281b4 at the front end portion of the clutch front tooth 281b and the slanted surfaces 281b2 intersect are chamfered and rounded in a typical R-form.

Figure 6:
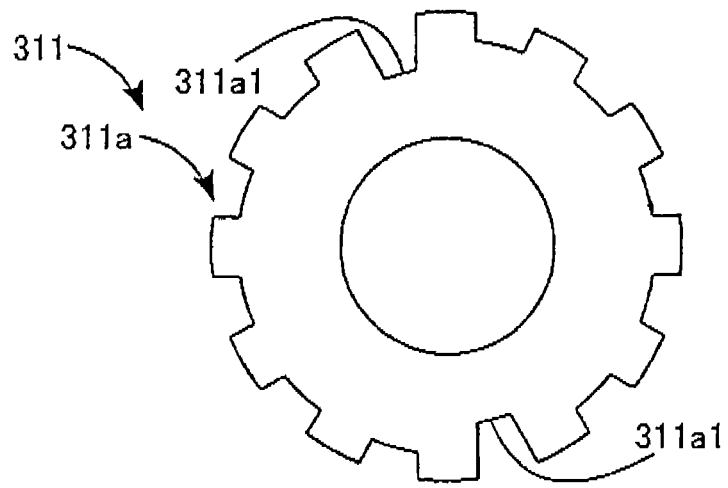
FIG. 6 is a plan view drawing illustrating the clutch hub illustrated in FIG. 4.

As FIGS. 4 and 6 illustrate, a spline 311a is formed on an outer peripheral surface of the clutch hub 311. The spline 312a is formed on an inner peripheral surface of the sleeve 312. The spline 311a engages with the spline 312a to be slidable in the direction of the axis of the main shaft 23. The spline 311a is formed with a multiple number of recesses 311a1, for example, two recesses 311a1, having recessed deeper than the rest of the recesses. The mentioned multiple number of recesses 311a1 are recesses corresponding to a multiple number of high teeth 312a1.

Figure 7:
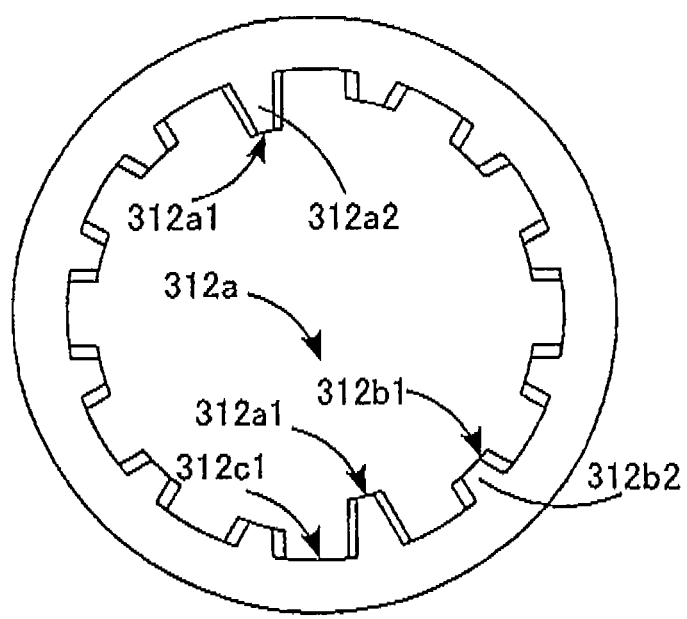
FIG. 7 is a plan view drawing illustrating the sleeve illustrated in FIG. 4.

As FIGS. 4 and 7 illustrate, the sleeve 312 is formed in a ring form. The sleeve 312 integrally rotates with the clutch hub 311. Furthermore, the sleeve 312 is arranged to be slidable in an axial direction relative to the clutch hub 311. The spline 312a is formed on an inner peripheral surface of the sleeve 312. The spline 312a engages with the spline 311a formed on the outer peripheral surface of the clutch hub 311 to be slidable in the axial direction.

The spline 312a is formed with a multiple number of high teeth 312a1, for example, two high teeth 312a1, protruding higher than the rest of low teeth 312b1, Edge portions of each of the high teeth 312a1 and each of the low teeth 312b1, which are the edge portions at the front end surface in the direction of the first gear 281, are chamfered in 45 degrees angle to form a typical C-form in order to protect the high teeth 312a1 and the low teeth 312b1 from being damaged by a shock at a time at which the high teeth 312a1 and the low teeth 312b1 make contact with the clutch front teeth 281b1 and the clutch rear teeth 281c1. Furthermore, on an outer peripheral surface of the sleeve 312, an outer peripheral recess 312d is formed in a direction conforming to a circumferential direction of the sleeve 312. An arc form portion at an end of the fork 313a engages with the outer peripheral recess 312d to be slidable in the circumferential direction.

As FIG. 3 illustrates, the shaft moving apparatus 313 is an apparatus making the sleeve 312 to move back and forth in a direction that conforms to the axial direction of the sleeve 312. The shaft moving apparatus 313 is arranged such that the shaft moving apparatus 313 allows the sleeve 312 to move by a reaction force exerted from the first gear 281 or the second gear 282 at a time at which the sleeve 312 is pushed on the first gear 281 or the second gear 282. The shaft moving apparatus 323 is similarly arranged.

The shaft moving apparatus 313 includes, as exemplary components, a fork 313a, a fork shaft 313b, a detent mechanism 313c, and a linear actuator 313d. Similarly, the shaft moving apparatus 323 includes, as exemplary components, a fork 323a, a fork shaft 323b, a detent mechanism 323c, and a linear actuator 323d. The shaft moving apparatus 313 will be described in detail next.

An end portion of the fork 313a is formed to fit to an outer peripheral form of the outer peripheral recess 312d of the sleeve 312. A base end portion of the fork 313a is fixed on the fork shaft 313b. The fork shaft 313b is supported on the casing 21 to be slidable in a direction conforming to the axial direction of the fork shaft 313b. More specifically, one end of the fork shaft 313b, which is rightward end in FIG. 3, is supported with a bearing 313e on the second wall 21c. The other end of the fork shaft 313b, which is leftward end in FIG. 3, is fixed on a bracket 313f. The bracket 313f is arranged to be slidable on a guide member 313g protruding from the first wall 21b in the axial direction of the fork shaft 313b. The guide member 313g is a member that restrains the bracket 313f from rotating. At the same time, the bracket 313f is fixed on a nut member 313h in a state where the bracket 313f is restrained from rotating relative to the nut member 313h. The nut member 313h is threadably mounted on a driving shaft 313i to be movable, the driving shaft 313i including the linear actuator 313d. The driving shaft 313i supported with a bearing 313j on the first wall 21b.

The detent mechanism 313c is a mechanism that controls position of the sleeve 312 by controlling slide position of the fork shaft 313b in the axial direction. The detent mechanism 313c includes a stopper 313c1, which is biased in a perpendicular direction relative to an axis of the fork shaft 313b by a spring. The stopper 313c1 fits into triangular grooves s1, sn, s2 formed on the fork shaft 313b by a spring force so that the detent mechanism 313c may control slide position of the fork shaft 313b in the axial direction.

Figure 10A:
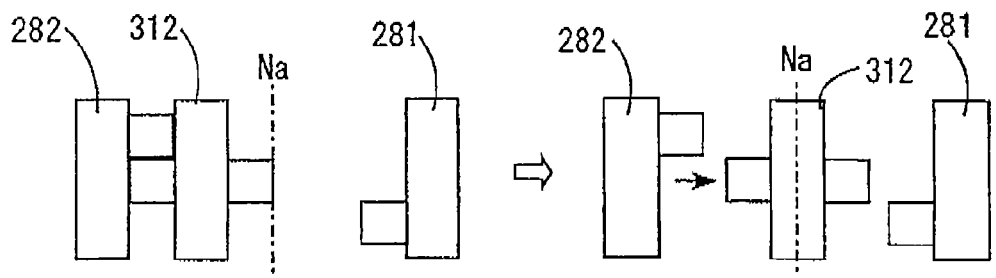
FIG. 10A is a drawing illustrating an operation at a second gear on gear shift from second speed to third speed controlled by a shift control unit.

More specifically, the stopper 313c1 fits into the triangular groove s1 when the spline 312a of the sleeve 312 and the first dog clutch portion 281a of the first gear 281 are engaged. The stopper 313c1 fits into the triangular groove sn when the sleeve 312 is positioned at a neutral position Na. The neutral position Na, which is illustrated in FIG. 10A, is defined at a position in an intermediate portion between the first gear 281 and the second gear 282. The stopper 313c1 fits into the triangular groove s2 when the spline 312a of the sleeve 312 and the second dog clutch portion 282a of the second gear 282 are engaged.

An exemplary type of a linear actuator 313d is a ball screw type linear actuator. The linear actuator 313d, as exemplary components, includes a casing, a rotor, a driving shaft 313i, and a nut member 313h. The casing is formed in a hollow cylinder and includes a multiple number of coils serving as a stator arranged in a direction of the inner circumference of the casing. The rotor is arranged relative to the stator to be rotatable. The rotor includes a multiple number of N-pole magnets and a multiple number of S-pole magnets alternately arranged on the outer periphery of the rotor. The magnets are arranged to face the stator with a magnetic clearance defined between the magnets and the stator. The driving shaft 313i, which is a ball screw shaft, integrally rotates with the rotor with rotational axis of the stator as rotational center. The nut member 313h includes a ball nut to be threadably mounted on the driving shaft 313i.

The driving shaft 313*i* is screwed into the nut member 313*h* to be rotatable relative to the nut member 313*h* via a multiple number of balls. By controlling electricity supply to each coil of the stator, the driving shaft 313*i* rotates in positive direction or negative direction, whichever selected. Accordingly, the nut member 313*h* and the fork shaft 313*b* are moved back and forth on the driving shaft 313*i* and are retained at a selected position. Furthermore, in the linear actuator 313*d*, a long lead is formed on the driving shaft 313*i* so that the sleeve 312 is allowed to move by a reaction force from the first gear 281 or the second gear 282. As a result, for example, the spline 312*a* of the sleeve 312 and the second dog clutch portion 282*a* of the second gear 282 may be reliably put into engagement.

In the automatic shift apparatus 13 according to the embodiment, the linear actuator 313*d* is a ball screw type linear actuator. Nevertheless, the linear actuator 313*d* may be replaced by other types of an actuator, for example, a solenoid type actuator or an oil pressure type actuator, on condition that the actuator is arranged such that the actuator allows movement of the sleeve 312 by a reaction force from the first gear 281 or the second gear 282 while the sleeve 312 is pushed on the first gear 281 or the second gear 282. The position detection sensor 314 is a sensor for detecting position of the sleeve 312 while the sleeve 312 is operated to move. The position detection sensor 314 uses various types of position sensor, for example, an optical position sensor and a linear encoder.

Third, an operation of the dog clutch gear shift mechanism 252 will be described. More specifically, operations of the high teeth 312*a*1 and the low teeth 312*b*1 of the sleeve 312 and of clutch front teeth 281*b*1 and the clutch rear teeth 281*c*1 of the first gear 281 will be described referring to FIGS. 8A through 8D and FIGS. 9A through 9D. In a case where, for example, the sleeve 312 is meshed with the second gear 282 and is rotating in high speed and the first gear is rotating in low speed, a speed of the sleeve 312 decreases when the sleeve 312 is shifted to mesh with the first gear 281. On the other hand, in a case where the sleeve 312 is meshed with the first gear and is rotating in low speed and the second gear 282 is rotating in high speed, the speed of the sleeve 312 increases when the sleeve 312 is shifted to mesh with the second gear 282. An operation where the speed of the sleeve 312 decreases will be described.

Figure 8A:
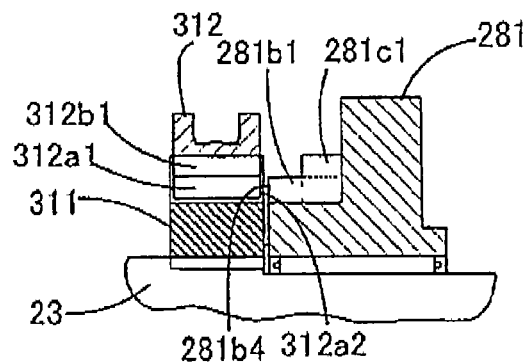
FIG. 8A is a cross-sectional drawing illustrating the dog clutch gear shift mechanism illustrated in FIG. 4 in a state where the dog clutch gear shift mechanism is before shifted.
Figure 8B:
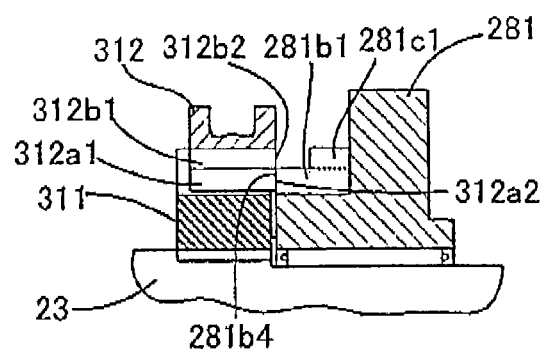
FIG. 8B is a cross-sectional drawing illustrating the dog clutch gear shift mechanism illustrated in FIG. 4 illustrating a state where a high tooth has come into contact with a clutch front tooth.

As FIG. 8A illustrates, the sleeve 312 is at a distance from the first gear 281 with a clearance between the sleeve 312 and the first gear 281 before the automatic shift apparatus 13 initiates shifting operation. When the shaft moving apparatus 313 moves the sleeve 312 in the axial direction toward the first gear 281, front end surfaces 312*a*2 of the high teeth 312*a*1 come into contact with the contact surfaces 281*b*4 of the clutch front teeth 281*b*1. At this moment, nothing is in contact with the low teeth 312*b*1. As a result, the speed of the sleeve 312 slightly decreases.

Figure 9A:
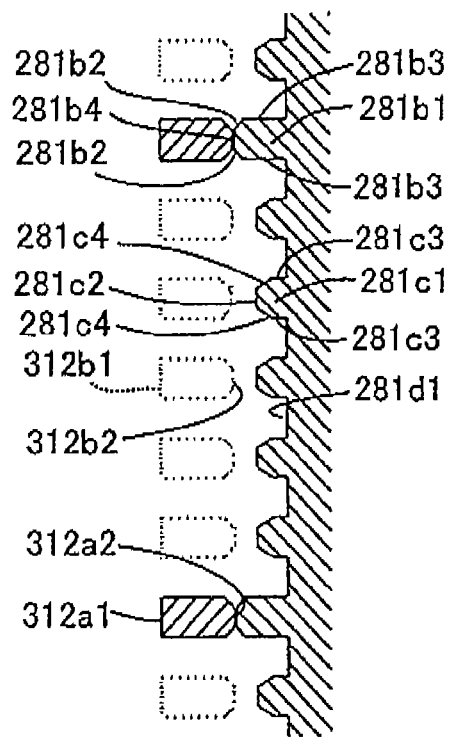
FIG. 9A is an expanded drawing illustrating the dog clutch gear shift mechanism illustrated in FIG. 4 illustrating a state where the high tooth has come into contact with the clutch front tooth.
Figure 9B:
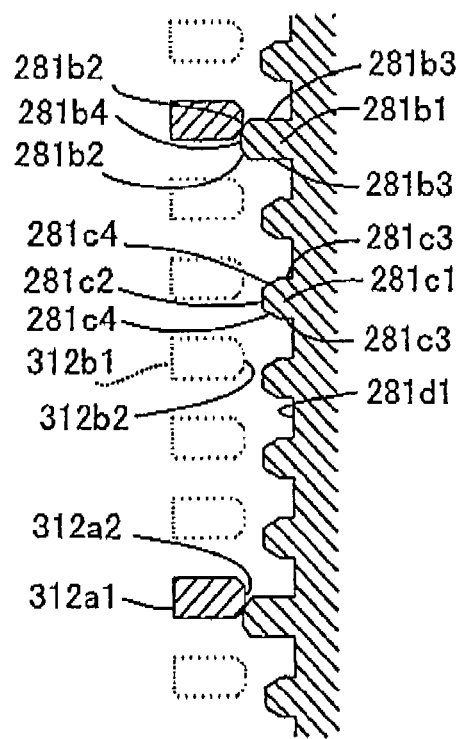
FIG. 9B is an expanded drawing illustrating the dog clutch gear shift mechanism illustrated in FIG. 4 illustrating a state where the high tooth has come into contact with a slanted surface of the clutch front tooth.

When the shaft moving apparatus 313 further moves the sleeve 312 in the axial direction, as FIG. 9B illustrates, the front end surfaces 312*a*2 of the high teeth 312*a*1, which are chamfered portions, make contact with the slanted surfaces 281*b*2 of the clutch front teeth 281*b*1. At this moment, nothing is in contact with the low teeth 312*b*1. As a result, the speed of the sleeve 312 significantly decreases.

Figure 8C:
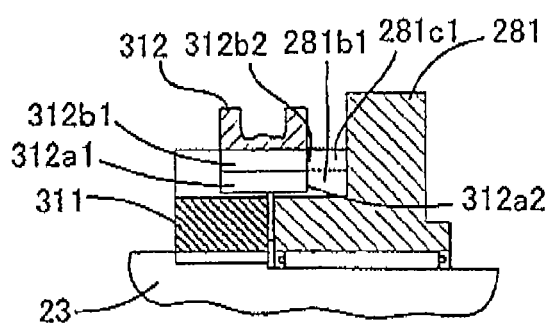
FIG. 8C is a cross-sectional drawing illustrating the dog clutch gear shift mechanism illustrated in FIG. 4 illustrating a state where each of the high tooth and a low tooth has come into contact with a clutch rear tooth.
Figure 9C:
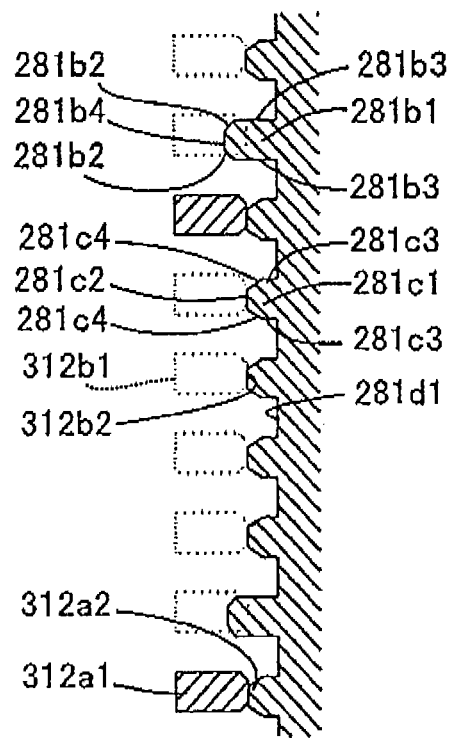
FIG. 9C is an expanded drawing illustrating the dog clutch gear shift mechanism illustrated in FIG. 4 illustrating a state where each of the high tooth and the low tooth has come into contact with a contact surface of the clutch rear tooth.

When the shaft moving apparatus 313 moves the sleeve 312 more in the axial direction, as FIGS. 8C and 9C illustrate, the front end surfaces 312*a*2 of the high teeth 312*a*1 and the front end surfaces 312*b*2 of the low teeth 312*b*1 make contact with the contact surfaces 281*c*2 of the clutch rear teeth 281*c*1. As a result, the speed of the sleeve 312 slightly decreases.

When the shaft moving apparatus 313 further moves the sleeve 312 in the axial direction, the front end surfaces 312*a*2 of the high teeth 312*a*1, which are chamfered portions, and the front end surfaces 312*b*2 of the low teeth 312*b*1, which are chamfered portions, make contact with the side slanted surfaces 281*c*4 of the clutch rear teeth 281*c*1. Each of the high teeth 312*a*1 and the low teeth 312*b*1 may enter nearby clutch tooth recess 281*d*1 in a short period of time because the clutch front teeth 281*b*1 and the clutch rear teeth 281*c*1 are formed spaced apart on the outer peripheral portion of the protruding portion 281*a*1 by the clutch teeth recess 281*d*1 having a unique width formed between each of the clutch front teeth 281*b*1 and the clutch rear teeth 281*c*1. As a result, the speed of the sleeve 312 significantly decreases.

Figure 8D:
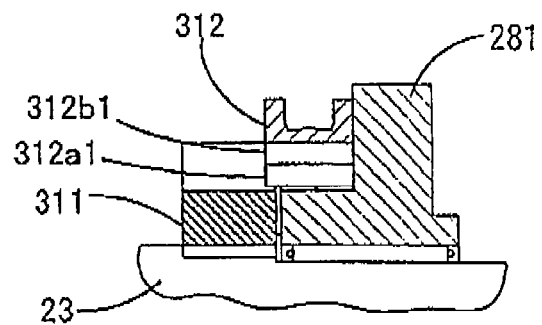
FIG. 8D is a cross-sectional drawing illustrating the dog clutch gear shift mechanism illustrated in FIG. 4 illustrating a state where each of the high tooth and the low tooth has meshed with the clutch rear tooth.
Figure 9D:
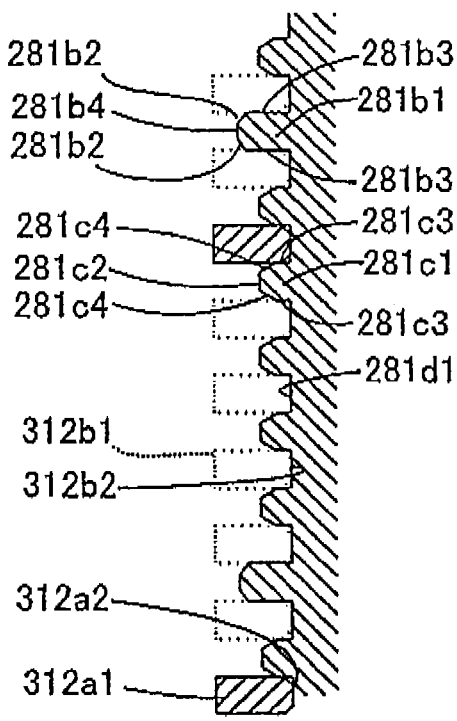
FIG. 9D is an expanded drawing illustrating the dog clutch gear shift mechanism illustrated in FIG. 4 illustrating a state where each of the high tooth and the low tooth has meshed with the clutch rear tooth.

When the shaft moving apparatus 313 moves the sleeve 312 more in the axial direction, as FIGS. 8D and 9D illustrate, the high teeth 312*a*1 and the low teeth 312*b*1 completely mesh with the clutch rear teeth 281*c*1. As a result, the sleeve 312 and the first gear 281 synchronously rotate and the shift operation ends.

Figure 10B:
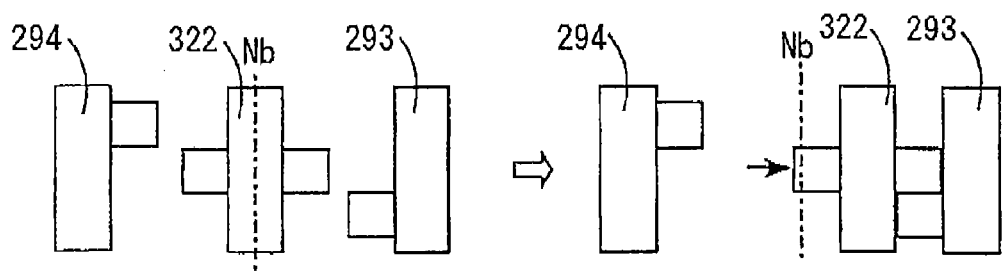
FIG. 10B is a drawing illustrating an operation at a third counter gear on gear shift from second speed to third speed controlled by the shift control unit.

Fourth, a control operation by the shift control unit 26 will be described. More specifically a control operation by the shift control unit 26 when shifting from second speed to third speed will be described. As FIG. 10A illustrates, the shift control unit 26 controls the shaft moving apparatus 313 to move the sleeve 312 that is in an engaged state engaged with the second gear 282 to the neutral position Na, which is defined at a position between the first gear 281 and the second gear 282, and stops the sleeve 312 at the neutral position Na. Furthermore, as FIG. 10B illustrates, the shift control unit 26 controls the shaft moving apparatus 323 to move the sleeve 322 that is in a stopped state at a neutral position Nb, which is defined at a position between the third counter gear 293 and the fourth counter gear 294, toward the third counter gear 293 and makes the sleeve 322 engage with the third counter gear 293. The neutral position Nb serves as a separate neutral position.

In the automatic shift apparatus 13 according to the embodiment, each of separation distances between the first gear 281 and the second gear 282 and between the third counter gear 293 and the fourth counter gear 294 are formed in a short distance for making the shift time short. Nevertheless, for example, in a state where mechanisms for shifting gears include looseness, the sleeve 312 may contact the first gear 281 by swinging movement in the axial direction at a time at which movement of the sleeve 312 is made to stop at the neutral position Na. In a state where rotational speed of the first gear 281 is high, a shift shock and a contact noise are generated as a result of the sleeve 312 making contact with the first gear 281, which are considered as disadvantages.

Figure 11:
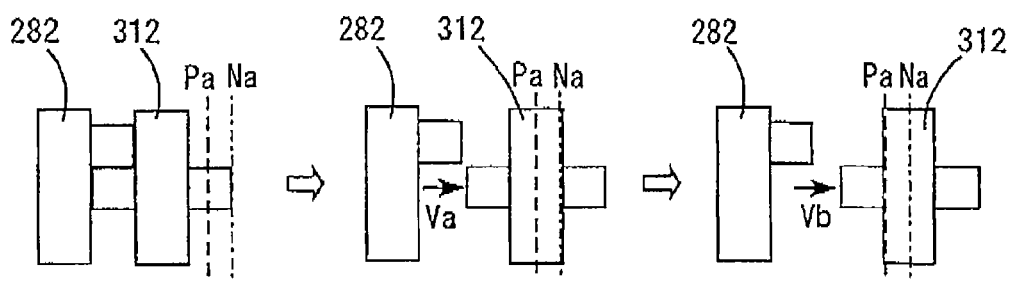
FIG. 11 is a drawing illustrating a sleeve disengagement operation controlled by the shift control unit.

Accordingly, as FIG. 11 illustrates, in the shift control unit 26 of the automatic shift apparatus 13 according to the embodiment, a target position Pa is defined at a position between the neutral position Na and the second gear 282 in an engaged state engaged with the sleeve 312. The target position Pa is defined at a position where the sleeve 312 and the second gear 282 disengage, the position where the sleeve 312 does not make contact with the first gear 281 as a result of swinging movement of the sleeve 312 in the axial direction at a time at which movement of the sleeve 312 is made to stop at the target position Pa, the position close to the neutral position Na. As a result, a speed to move the sleeve 312 to the target position Pa may be increased. From the target position Pa to the neutral position Na, the sleeve 312 is moved at a speed that does not cause the sleeve 312 to contact the first gear 281 even in a state where the first gear 281 swings in the axial direction. In other words, the shift control unit 26 controls a moving speed Va of the sleeve 312 for moving the sleeve 312 in the engaged state to the target position Pa to be faster than a moving speed Vb of the sleeve 312 for moving the sleeve 312 from the target position Pa to the neutral position Na. As a result, shift time may be shortened. The moving speed Va serves as the first moving speed and the moving speed Vb serves as the second moving speed.

Figure 12:
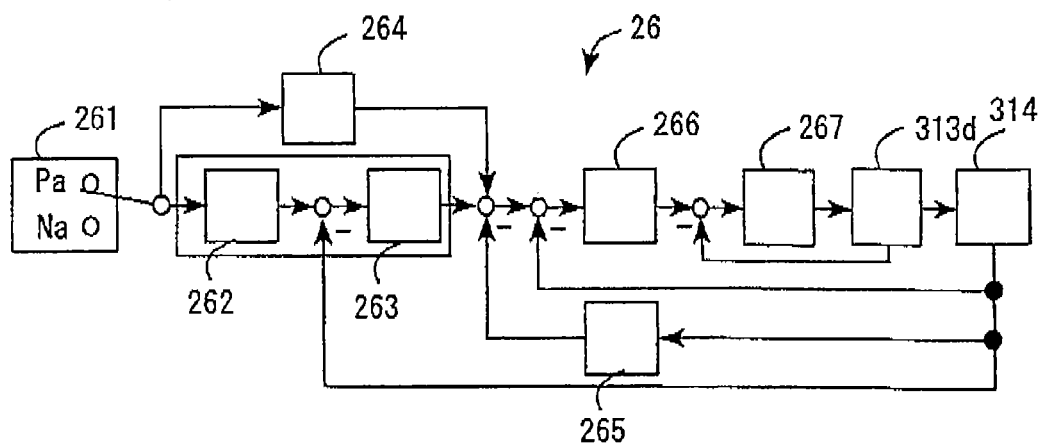
FIG. 12 is a block diagram illustrating functional portions of the shift control unit.

Fifth, an arrangement of the shift control unit 26 will be described. As FIG. 12 illustrates, the shift control unit 26 includes a position setting portion 261, a low pass filter portion 262, an I-control portion 263, an FF-control portion 264, a PD-control portion 265, a P-control portion 266, and a PI-control portion 267. The shift control unit 26 performs known proportional-integral-derivative control (PID control) and feed forward control to generate a control electric current based on information of position of the sleeve 312 and supplies the control electric current to the linear actuator 313d. More specifically, the position setting portion 261 selects between the target position Pa and the neutral position Na and defines the target position Pa and the neutral position Na as a position for the sleeve 312 to move to. The low pass filter portion 262 defines and commands targeting positions for the sleeve 312 to smoothly move during a period during which the sleeve 312 moves to the target position Pa and to the neutral position Na, whichever defined in the position setting portion 261.

Figure 19:
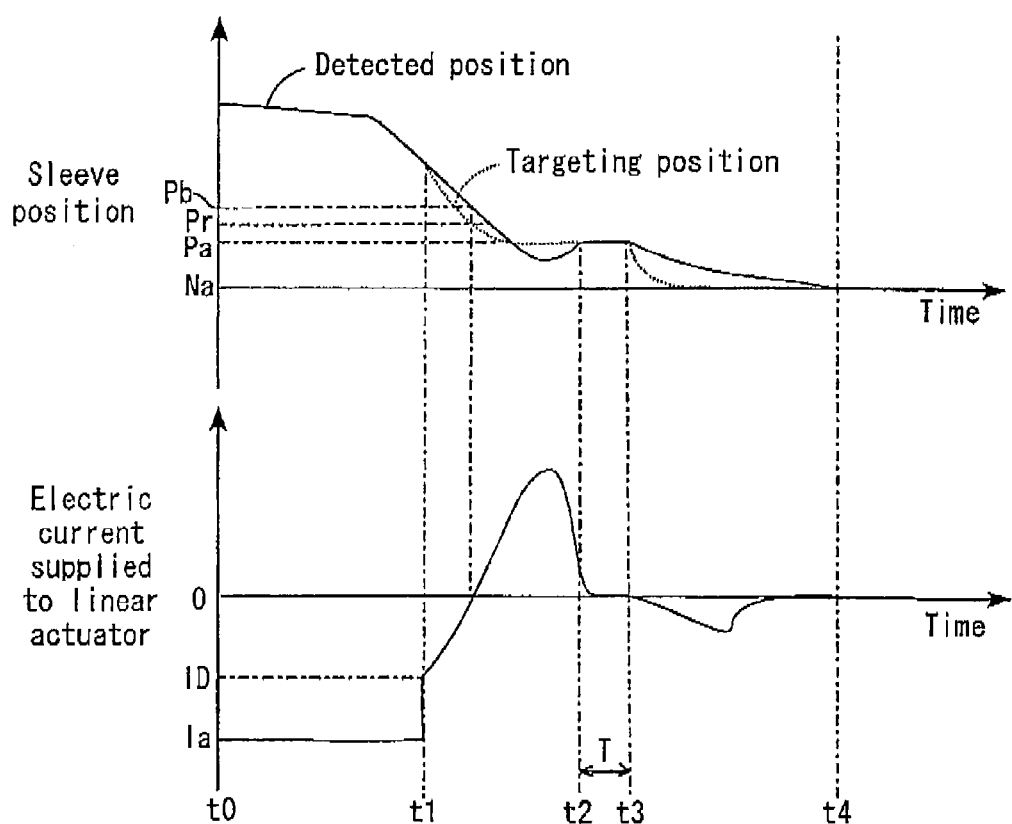
FIG. 19 is a drawing illustrating sleeve position and change of electric current supplied to a linear actuator with elapse of time during a period during which the sleeve moves controlled by the shift control unit.

The I-control portion 263 calculates a control command value IA for performing a control proportional to an integral of a deviation between the targeting position information obtained from the low pass filter portion 262 and detected position information obtained from the position detection sensor 314. The FF-control portion 264 outputs a feed forward command value ID for making the sleeve 312 move fast to quickly settle the sleeve 312 at the target position Pa based on information of the target position Pa defined at the position setting portion 261. The FF-control portion 264 outputs the feed forward command value ID during a period of an initial feedback control performed between a point in time t1 and a point in time t3, which is illustrated in FIG. 19. The feed forward command value ID is added to the control command value IA calculated in the I-control portion 263.

The PD-control portion 265 calculates control command values IB, IC for performing a control based on a moving speed of the sleeve 312 calculated from a temporal differentiation of a deviation of the detected position information obtained from the position detection sensor 314. The control command values IB, IC calculated at the PD-control portion 265 are subtracted from the control command value IA calculated at the I-control portion 263. The P-control portion 266 calculates a target electric current for performing a control proportional to a deviation between the detected position information obtained from the position detection sensor 314 and the control command values IA, IB, IC, ID from the I-control portion, the FF-control portion 264, and the PD-control portion 265, in order to prevent divergence. The PI-control portion 267 makes the actual electric current to match with the target electric current in accordance with a deviation between the target electric current from the P-control portion 266 and the detected electric current from the linear actuator 313d and in accordance with an integral of the deviation between the target electric current from the P-control portion 266 and the detected electric current from the linear actuator 313d.

Figure 13:
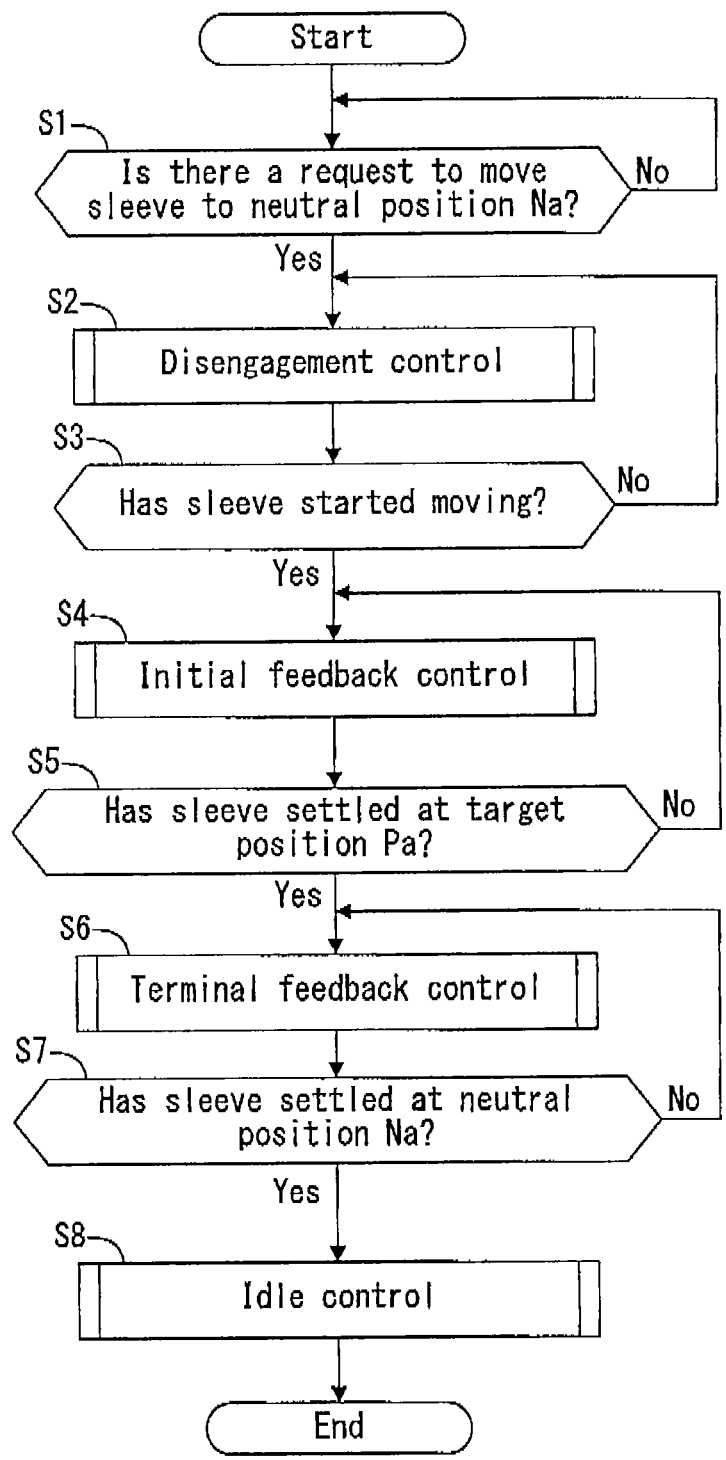
FIG. 13 is a main flow chart illustrating an overall process of moving the sleeve controlled by the shift control unit.
Figure 14:
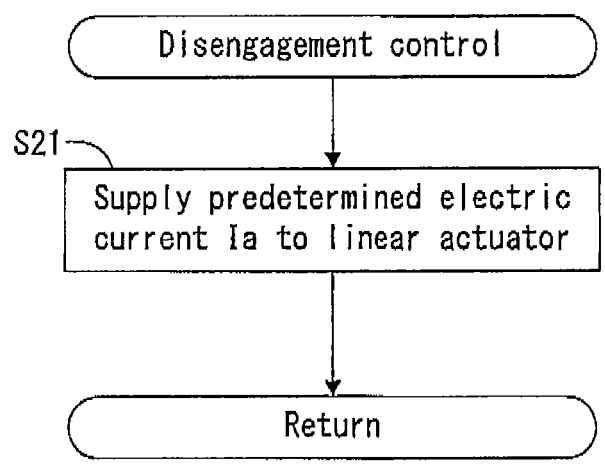
FIG. 14 is a flow chart illustrating a process of disengaging the sleeve controlled by the shift control unit, the process referred to as a disengagement control.

Sixth, processes in the shift control unit 26 will be described referring to flow charts illustrated in FIGS. 13 through 18 and a time chart illustrated in FIG. 19. As FIG. 13 illustrates, in step S1, the shift control unit 26 determines whether or not there is a request to move the sleeve 312 to the neutral position Na. In a case where there is a request to move the sleeve 312 to the neutral position Na, the shift control unit 26 performs a disengagement control to disengage the spline 312a of the sleeve 312 and the second dog clutch portion 282a of the second gear 282 in step S2. More specifically, as FIG. 14 illustrates, in step S21, the shift control unit 26 supplies a predetermined electric current Ia to the linear actuator 313d. On the other hand, in a case where there is no request to move the sleeve 312 to the neutral position Na, the shift control unit 26 waits to perform the disengagement control until there is a request to move the sleeve 312 to the neutral position Na.

In a state where the spline 312a of the sleeve 312 and the second dog clutch portion 282a of the second gear 282 are engaged, the sleeve 312 may not be easily moved because coefficient of static friction between the spline 312a of the sleeve 312 and the second dog clutch portion 282a of the second gear 282 is large, however, when the shift control unit 26 starts supplying the predetermined electric current Ia from the point in time t0, the sleeve 312 is exerted with a thrust force in a direction of movement by an amount corresponding to the predetermined electric current Ia and the sleeve 312 gradually moves so that the spline 312a of the sleeve 312 starts to disengage from the second dog clutch portion 282a of the second gear 282 as FIG. 19 illustrates.

Figure 15:
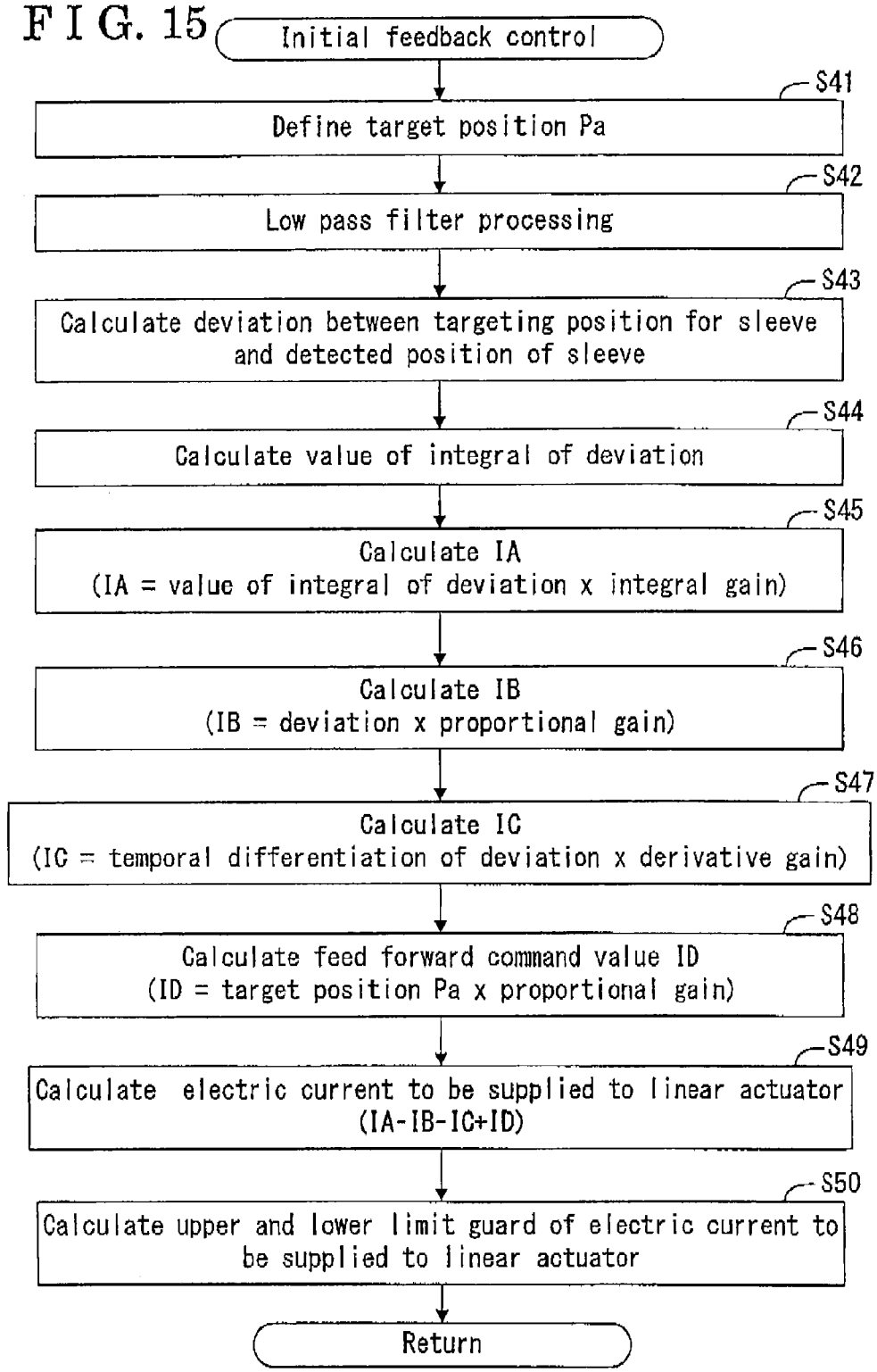
FIG. 15 is a flow chart illustrating a process of initially moving the sleeve controlled by the shift control unit, the process referred to as an initial feedback control.

Next, as FIG. 13 illustrates, the shift control unit 26 determines whether or not the sleeve 312 has started moving in step S3. In a case that the shift control unit 26 has determined that the sleeve 312 has started moving, in step S4, the shift control unit 26 performs an initial feed back control. More specifically, as FIG. 15 illustrates, the shift control unit 26 defines the target position Pa in step S41 and processes low pass filter processing in step 42. The low pass filter processing is processed to define and command the targeting positions for the sleeve 312 to smoothly move during a period during which the sleeve 312 moves to the target position Pa. On the other hand, in a case where the shift control unit 26 determines that the sleeve 312 has not started moving, the shift control unit 26 returns to the step S2.

Following the step S42, in step S43, a deviation between the targeting position for the sleeve 312 and the detected position of the sleeve 312 is calculated and, in step S44, a value of integral of the deviation is calculated. After the step S44, in step S45, the control command value IA is calculated by multiplying the value of integral of the deviation by an integral gain at the I-control portion 263. At the PD-control portion 265, the control command value IB is calculated by multiplying the deviation by a proportional gain in step S46 and the control command value IC is calculated by multiplying a temporal differentiation of the deviation by a derivative gain in step S47.

In step S48 following the step S47, at the FF-control portion 264, the feed forward command value ID for making the sleeve 312 move fast and quickly settle at the target position Pa is calculated by multiplying the target position Pa by a proportional gain. In step S49, an electric current to be finally supplied to the linear actuator 313d for controlling the linear actuator 313d to move the sleeve 312 is calculated by adding the feed forward command value ID calculated in the step S48 to the control command value IA calculated in the step S45, then subtracting the control command value IB calculated in the step 346 and the control command value IC calculated in the step S47. The electric current to be supplied to the linear actuator 313d for controlling the linear actuator 313d here may be written as IA−IB−IC+ID, In step S50 following the step S49, upper and lower limit guard of the electric current to be supplied to the linear actuator 313d for preventing the linear actuator 313d from damaging is calculated.

Accordingly, as FIG. 19 illustrates, between the point in time t1 at which feedback control begins and the point in time t3, the feed forward electric current, which is another way to describe the feed forward command value ID, is supplied to the linear actuator 313d. The electric current IA−IB−IC+ID, which reduces the electric current supplied to the linear actuator 313d at once and then increases toward zero, is supplied from the point in time t1 so that the sleeve 312 moves relatively fast toward the target position Pa. At this time, the shift control unit 26 controls the linear actuator 313d to control the sleeve 312 to be at the targeting positions illustrated with a broken line in FIG. 19 in order to move the sleeve 312 smoothly as illustrated with a solid line in FIG. 19.

As FIG. 19 illustrates, the shift control unit 26 performs a control that exerts a braking force on the sleeve 312, the braking force directed in the opposite direction relative to a direction of movement of the sleeve 312, before the spline 312a of the sleeve 312 engaged with the second dog clutch portion 282a of the second gear 282 disengages from the second dog clutch portion 282a of the second gear 282. More specifically, the sleeve 312 is exerted with the braking force before the sleeve 312 reaches a position Pr, which is a position defined at a position closer to the second gear 282 relative to the target position Pa. Favorably, the braking force is exerted on the sleeve 312 immediately before the sleeve 312 reaches the position Pr. As a result, the sleeve 312 may be settled at the target position Pa even in a state where the moving speed of the sleeve 312 is increased by defining the targeting positions for the sleeve 312 at positions that make the sleeve 312 to displace by a large amount.

Exerting of the braking force on the sleeve 312 starts at a point where the electric current supplied to the linear actuator 313d reaches zero and crosses over zero. In other words, the braking force is exerted on the sleeve 312 when the position of the sleeve 312 reaches a position Pb and moves further in the direction of movement of the sleeve 312 relative to the position Pb. Until the electric current supplied to the linear actuator 313d reaches a point that crosses zero from the point in time t1, which is the point in time the feed back control begins, an electric current is supplied to the linear actuator 313d for quickly pulling the spline 312a of the sleeve 312 from the second dog clutch portion 282a of the second gear 282. As a result, the sleeve 312 is not exerted with the braking force. Note that, a PID control alone may control the sleeve 312 to be exerted with a braking force that is directed in the opposite direction relative to the direction of movement of the sleeve 312.

The feed forward control described earlier may control the sleeve 312 to move faster and to quickly settle at the target position Pa. Furthermore, the PID control described earlier allows exerting of the braking force on the sleeve 312 before the spline 312a of the sleeve 312 engaged with the second dog clutch portion 282a of the second gear 282 disengages from the second dog clutch portion 282a of the second gear 282. As a result, the sleeve 312 may be swiftly stopped at the target position Pa.

In step S5 following the step S4, as FIG. 13 illustrates, the shift control unit 26 determines whether or not the sleeve has settled at the target position Pa. In a case where the shift control unit 26 determines that the sleeve has not settled at the target position Pa, the shift control unit 26 returns to the previous step S4. In a case where the sleeve 312 has settled at the target position Pa in the step S5, as FIG. 19 illustrates, the shift control unit 26 determines that the sleeve 312 has settled at the target position Pa at the point in time t3, which is the point in time where a difference between the targeting position for the sleeve 312 and the actual position of the sleeve 312 becomes smaller than a predetermined value at a point in time t2 and after a predetermined time T has elapsed from the point in time t2. Note that, in FIG. 19, the broken line illustrates the targeting position for the sleeve 312 and the solid line illustrates the actual position of the sleeve 312. As a result of waiting for the predetermined time T to elapse, swinging movement of the sleeve 312 in the axial direction, the sleeve 312 that has moved to the target position Pa, may be dampened. Accordingly, the moving speed of the sleeve 312 from the target point Pa to the neutral point Na may be increased.

Figure 18:
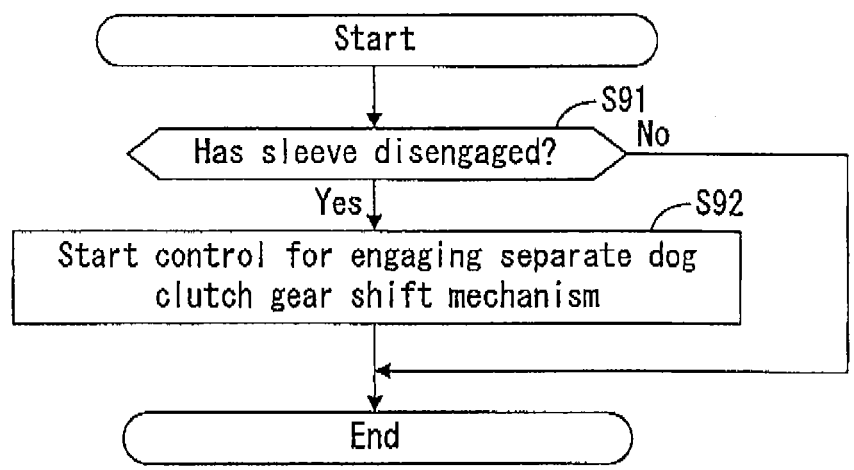
FIG. 18 is a flow chart illustrating a process of disengaging a separate sleeve controlled by the shift control unit.

When the shift control unit 26 determines that the sleeve 312 has settled at the target position Pa, the shift control unit 26 begins control for engaging the spline of the sleeve 322 with the third dog clutch portion 293a of the third counter gear 293. The process illustrated in FIG. 18 is an interrupt handling routine, which is separate from the process of FIG. 13, separately executed at an occurrence of a predetermined condition. More specifically, as FIG. 18 illustrates, in a state where the sleeve 312 has settled at the target position Pa and the shift control unit 26 determines that the spline 312a of the sleeve 312 and the second dog clutch portion 282a of the second gear 282 are disengaged in step S91, the shift control unit 26 controls the sleeve 322, which is in a stopped state at a neutral position Nb, to start moving toward the third counter gear 293 to engage the spline of the sleeve 322 with the third dog clutch portion 293a of the third counter gear 293 in step S92.

Figure 16:
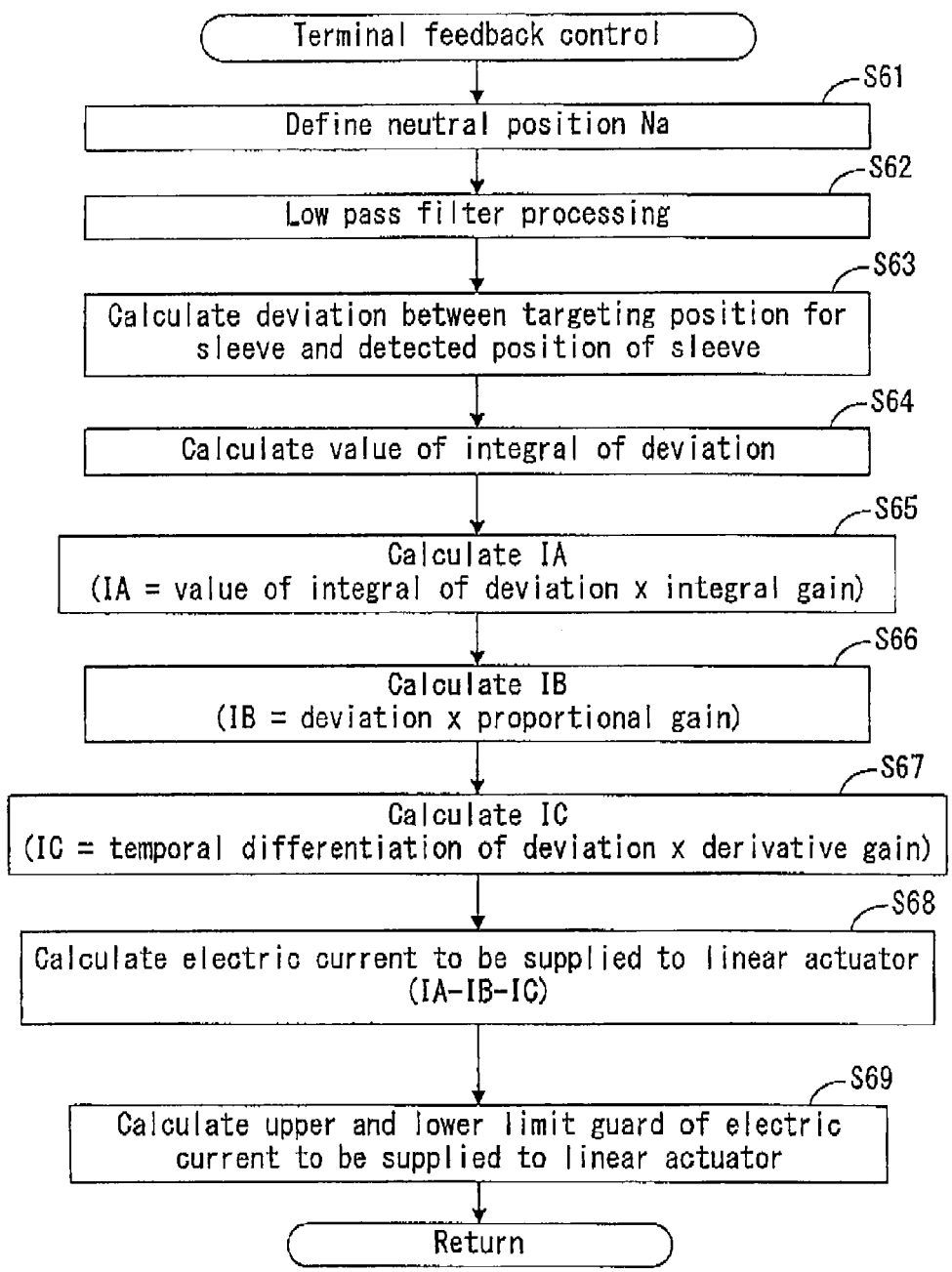
FIG. 16 is a flow chart illustrating a process of terminally moving the sleeve controlled by the shift control unit, the process referred to as a terminal feed back control.

Meanwhile, as FIG. 13 illustrates, in step S6, the shift control unit 26 performs a terminal feedback control when the shift control unit 26 has determined that the sleeve 312 has settled at the target position Pa. More specifically, as FIG. 16 illustrates, the shift control unit 26 defines the neutral position Na in step S61, which is followed by processes from step S62 to step S69. The processes from the step S62 to the step S69 are similar to the processes from the step S42 to the step S51, which are illustrated in FIG. 15, however, processes of calculating and adding a feed forward electric current are excluded. In other words, processes similar to the steps S48 and the step S49 are excluded, where the step S48 is the process of calculating the feed forward command value ID and the step S49 is the process of adding the feed forward command value ID.

Accordingly, as FIG. 19 illustrates, from the point in time t3, an electric current IA−IB−IC, which temporarily increases and then decreases toward zero, is supplied so that the sleeve 312 moves relatively slow toward the neutral position Na. In other words, the sleeve 312 moves toward the neutral position Na with a moving speed, or a velocity, slower than the moving speed the sleeve 312 has moved to reach the target position Pa. At this time, the shift control unit 26 controls the linear actuator 313d to control the sleeve 312 to be at the targeting positions illustrated with the broken line in FIG. 19 in order to move the sleeve 312 smoothly as illustrated with the solid line in FIG. 19.

In step S7 following the step S6, as FIG. 13 illustrates, the shift control unit 26 determines whether or not the sleeve has settled at the neutral position Na. In a case where the shift control unit 26 determines that the sleeve has not settled at the neutral position Na, the shift control unit 26 returns to the previous step S6. In a case where the sleeve 312 has settled at the target position Na in the step S7, as FIG. 19 illustrates, the shift control unit 26 determines that the sleeve 312 has settled at the neutral position Na at a point in time t4, which is a point in time where a difference between the targeting position for the sleeve 312 and the actual position of the sleeve 312 becomes smaller than a predetermined value. Note that, in FIG. 19, the broken line illustrates the targeting position for the sleeve 312 and the solid line illustrates the actual position of the sleeve 312.

Figure 17:
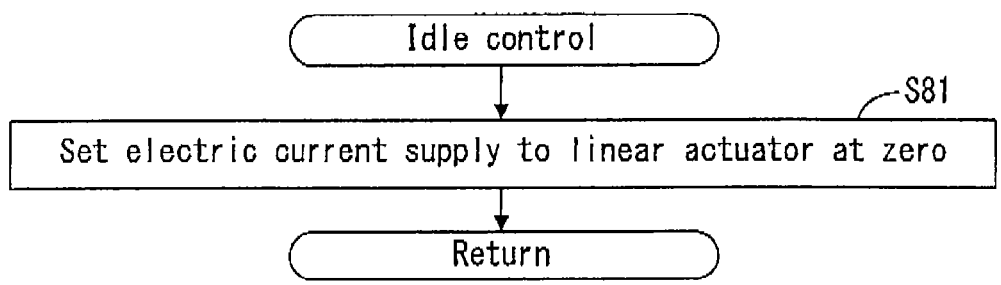
FIG. 17 is a flow chart illustrating a process of maintaining the sleeve in an idle state controlled by the shift control unit, the process referred to as an idle control.

As FIG. 13 illustrates, in step S8, the shift control unit 26 performs an idle control in a state where the shift control unit 26 has determined that the sleeve 312 has settled at the neutral position Na. More specifically, as FIG. 17 illustrates, the shift control unit 26 sets electric current supply to the linear actuator 313d at zero in step S81.

Seventh, alternative processes in the shift control unit 26 will be described. In the shift control unit 26 in the automatic shift apparatus 13 according to the embodiment, the shift control unit 26 determines whether or not the sleeve 312 has settled at the target position Pa at the point in time t3, which is the point in time where the difference between the targeting position for the sleeve 312 and the actual position of the sleeve 312 becomes smaller than the predetermined value at the point in time t2 and after the predetermined time T has elapsed from the point in time t2. Nevertheless, the shift control unit 26 may be arranged such that the shift control unit 26 determines the sleeve 312 has settled at the target position Pa and proceeds to initiate the terminal feedback control at a point in time where the difference between the targeting position for the sleeve 312 and the actual position of the sleeve 312 becomes smaller than the predetermined value and without waiting for the predetermined time T to elapse. Similarly in such case, the sleeve 312 is controlled such that the sleeve 312 moves to the target position Pa in a moving speed faster than the moving speed at a period during which the sleeve 312 moves from the target position Pa to the neutral position Na.

In the shift control unit 26 in the automatic shift apparatus 13 according to the embodiment, the feed forward control is performed at the point in time t1 to supply the feed forward electric current, which is another way to describe the feed forward command value ID, to the linear actuator 313d. As a result, a time constant for the low pass filter processing for a period from the point in time t1 to the point in time t2 may be made to a large value. Alternatively, the time constant for the low pass filter processing for the period from the point in time t1 to the point in time t2 may be made to a small value so that the shift control unit 26 performs a control that is executed solely by the feedback control and without the feed forward control, although shift time may become slightly longer.

According to an aspect of this disclosure, an automatic shift apparatus 13 includes a rotation shaft (a main shaft 23, a counter shaft 24) axially supported to be rotatable about an axis of the rotation shaft (the main shaft 23, the counter shaft 24), the rotation shaft (the main shaft 23, the counter shaft 24) configured to be in rotary engagement with one of an input shaft and an output shaft of the automatic shift apparatus 13, a dog clutch gear shift mechanism 252 including a first clutch ring (a first gear 281) and a second clutch ring (a second gear 282) supported on the rotation shaft (the main shaft 23, the counter shaft 24) to be rotatable about the rotation shaft (the main shaft 23, the counter shaft 24), the first clutch ring (the first gear 281) providing a first gear ratio, the first clutch ring (the first gear 281) configured to be in rotary engagement with the other one of the input shaft and the output shaft, the second clutch ring (the second gear 282) providing a second gear ratio, the second clutch ring (the second gear 282) configured to be in rotary engagement with the other one of the input shaft and the output shaft, a hub (a clutch hub 311) fixed on the rotation shaft (the main shaft 23, the counter shaft 24) at a position between the first clutch ring (the first gear 281) and the second clutch ring (the second gear 282), the position adjacent to the first clutch ring (the first gear 281) and the second clutch ring (the second gear 282), a sleeve 312 fitted to the hub (the clutch hub 311), the sleeve 312 restrained from rotating relative to the hub (the clutch hub 311), the sleeve 312 allowed to move in a direction of the axis of the rotation shaft (the main shaft 23, the counter shaft 24), a first dog clutch portion 281a protrudingly arranged on a side of the first clutch ring (the first gear 281) in a direction of the sleeve 312 and a second dog clutch portion 282a protrudingly arranged on a side of the second clutch ring (the second gear 282) in a direction of the sleeve 312, the first dog clutch portion 281a and the second dog clutch portion 282a selectively meshing with a spline 312a formed on the sleeve 312 in response to axial movement of the sleeve 312, a shaft moving apparatus 313 moving the sleeve 312 in the direction of the axis of the rotation shaft (the main shaft 23, the counter shaft 24), and a sensor (a position detection sensor 314) detecting a position of the sleeve 312 in accordance with movement of the sleeve 312 in the direction of the axis of the rotation shaft (the main shaft 23, the counter shaft 24), and a control unit (a shift control unit 26) controlling an operation of the shaft moving apparatus 313 based on a detected position of the sleeve 312 detected by the sensor (the position detection sensor 314). The control unit (the shift control unit 26) controls first moving speed Va to be faster than second moving speed Vb on moving the sleeve 312 in an engaged state engaged with one of the first clutch ring (the first gear 281) and the second clutch ring (the second gear 282) to a neutral position Na defined at a position between the first clutch ring (the first gear 281) and the second clutch ring (the second gear 282) where the first moving speed Va is a speed of moving the sleeve 312 in the engaged state to a target position Pa defined between the neutral position Na and the mentioned one of the first clutch ring (the first gear 281) and the second clutch ring (the second gear 282) the sleeve 312 is engaged with and where the second moving speed Vb is a speed of moving the sleeve 312 from the target position Pa to the neutral position Na.

In a state where the sleeve 312 is moved to the neutral position Na by increasing moving speed of the sleeve 312 in order to reduce a shift time, swinging movement of the sleeve 312 in the direction of the axis of the rotation shaft (the main shaft 23, the counter shaft 24) becomes larger and may cause the sleeve 312 to contact the clutch ring (the first gear 281, the second gear 282) positioned at a position in the direction of movement of the sleeve 312. Accordingly, the target position Pa is defined at a position between the neutral position Na and the clutch ring (the first gear 281, the second gear 282) in the engaged state engaged with the sleeve 312, the position where the sleeve 312 does not make contact with the clutch ring (the first gear 281, the second gear 282) positioned at the position in the direction of movement of the sleeve 312 as a result of the swinging movement of the sleeve 312 in the direction of the axis of the rotation shaft (the main shaft 23, the counter shaft 24). As a result, the first moving speed Va of the sleeve 312 for moving the sleeve 312 to the target position Pa may be increased. Furthermore, from the target position Pa to the neutral position Na, the sleeve 312 is moved at the second moving speed Vb that does not cause the sleeve 312 to contact the clutch ring (the first gear 281, the second gear 282) positioned at the position in the direction of movement of the sleeve 312 by swinging in the direction of the axis of the rotation shaft (the main shaft 23, the counter shaft 24). As a result, the shift time may be shortened.

According to another aspect of this disclosure, the control unit (the shift control unit 26) of the automatic shift apparatus 13 controls the sleeve 312 to start moving from the target position Pa to the neutral position Na after an elapse of a predetermined period T from a point in time where the sleeve 312 reaches the target position Pa.

Accordingly, swinging movement in the direction of the axis of the rotation shaft (the main shaft 23, the counter shaft 24) of the sleeve 312 that has moved to the target position Pa may be dampened. As a result, the moving speed of the sleeve 312 from the target position Pa to the neutral position Na may be increased.

According to further aspect of this disclosure, the control unit (the shift control unit 26) of the automatic shift apparatus 13 performs a control to exert a predetermined force directing in moving direction of the sleeve 312 on the sleeve 312 when the sleeve 312 in the engaged state with one of the first clutch ring (the first gear 281) and the second clutch ring (the second gear 282) starts moving toward the target position Pa.

Upon the arrangement described herewith, the spline 312a formed on the sleeve 312 and the dog clutch portion (the first dog clutch portion 281a, the second dog clutch portion 282a) of the clutch ring (the first gear 281, the second gear 282) may be swiftly disengaged so that the shift time may be further shortened.

According to another aspect of this disclosure, the automatic shift apparatus 13 further includes a separate dog clutch gear shift mechanism (a dog clutch gear shift mechanism 251, a dog clutch gear shift mechanism 253, a dog clutch gear shift mechanism 254) including a separate clutch ring (a fifth gear 285, a reverse gear 28R, a third counter gear 293, a fourth counter gear 294, a sixth counter gear 296), a separate hub (a clutch hub 321), a separate sleeve (a sleeve 322), a separate dog clutch portion (a third dog clutch portion 293a), a separate shaft moving apparatus (a shaft moving apparatus 323), and a separate sensor (a position detection sensor 324). The control unit (the shift control unit 26) controls the separate sleeve (the sleeve 322) of the separate dog clutch gear shift mechanism (the dog clutch gear shift mechanism 251, the dog clutch gear shift mechanism 253, the dog clutch gear shift mechanism 254) positioned at a separate neutral position (a neutral position Nb) to start moving from the separate neutral position (the neutral position Nb) to the separate clutch ring (the fifth gear 285, the reverse gear 28R, the third counter gear 293, the fourth counter gear 294, the sixth counter gear 296) when the sleeve 312 of the dog clutch gear shift mechanism 252 reaches the target position Pa.

Accordingly, controlling engagement of a separate spline of the separate sleeve (the sleeve 322) and the separate dog clutch portion (the third dog clutch portion 293a) of the separate clutch ring (the fifth gear 285, the reverse gear 28R, the third counter gear 293, the fourth counter gear 294, the sixth counter gear 296) may be started at an earlier point in time. As a result, a shift time at the separate dog clutch mechanism (the dog clutch gear shift mechanism 251, the dog clutch gear shift mechanism 253, the dog clutch gear shift mechanism 254) may be shortened.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic shift apparatus comprising:
a rotation shaft axially supported to be rotatable about an axis of the rotation shaft, the rotation shaft configured to be in rotary engagement with one of an input shaft and an output shaft of the automatic shift apparatus;
a dog clutch gear shift mechanism including a first clutch ring and a second clutch ring supported on the rotation shaft to be rotatable about the rotation shaft, the first clutch ring providing a first gear ratio, the first clutch ring configured to be in rotary engagement with the other one of the input shaft and the output shaft, the second clutch ring providing a second gear ratio, the second clutch ring configured to be in rotary engagement with the other one of the input shaft and the output shaft, a hub fixed on the rotation shaft at a position between the first clutch ring and the second clutch ring, the position adjacent to the first clutch ring and the second clutch ring, a sleeve fitted to the hub, the sleeve restrained from rotating relative to the hub, the sleeve allowed to move in a direction of the axis of the rotation shaft, a first dog clutch portion protrudingly arranged on a side of the first clutch ring in a direction of the sleeve and a second dog clutch portion protrudingly arranged on a side of the second clutch ring in a direction of the sleeve, the first dog clutch portion and the second dog clutch portion selectively meshing with a spline formed on the sleeve in response to axial movement of the sleeve, a shaft moving apparatus moving the sleeve in the direction of the axis of the rotation shaft, and a sensor detecting a position of the sleeve in accordance with movement of the sleeve in the direction of the axis of the rotation shaft; and
a control unit controlling an operation of the shaft moving apparatus based on a detected position of the sleeve detected by the sensor, wherein
the control unit controls first moving speed to be faster than second moving speed on moving the sleeve in an engaged state engaged with one of the first clutch ring and the second clutch ring to a neutral position defined at a position between the first clutch ring and the second clutch ring where the first moving speed is a speed of moving the sleeve in the engaged state to a target position defined between the neutral position and said one of the first clutch ring and the second clutch ring the sleeve is engaged with and where the second moving speed is a speed of moving the sleeve from the target position to the neutral position.

2. The automatic shift apparatus according to claim 1, wherein the control unit controls the sleeve to start moving from the target position to the neutral position after an elapse of a predetermined period from a point in time where the sleeve reaches the target position.

3. The automatic shift apparatus according to claim 1, wherein the control unit performs a control to exert a predetermined force directing in moving direction of the sleeve on the sleeve when the sleeve in the engaged state with one of the first clutch ring and the second clutch ring starts moving toward the target position.

4. The automatic shift apparatus according to claim 1, further comprising:
a separate dog clutch gear shift mechanism including a separate clutch ring, a separate hub, a separate sleeve, a separate dog clutch portion, a separate shaft moving apparatus, and a separate sensor, wherein the control unit controls the separate sleeve of the separate dog clutch gear shift mechanism positioned at a separate neutral position to start moving from the separate neutral position to the separate clutch ring when the sleeve of the dog clutch gear shift mechanism reaches the target position.

* * * * *